(12) United States Patent
Spadoni et al.

(10) Patent No.: US 10,875,584 B2
(45) Date of Patent: Dec. 29, 2020

(54) SNOW GROOMER

(71) Applicant: PRINOTH S.P.A., Vipiteno (IT)

(72) Inventors: Riccardo Spadoni, Modena (IT);
Martin Kirchmair, Pfons (AT)

(73) Assignee: PRINOTH S.P.A., Vipiteno (IT)

( * ) Notice: Subject to any disclaimer, the term of this patent is extended or adjusted under 35 U.S.C. 154(b) by 63 days.

(21) Appl. No.: 16/091,340

(22) PCT Filed: Apr. 7, 2017

(86) PCT No.: PCT/IB2017/052020
§ 371 (c)(1),
(2) Date: Oct. 4, 2018

(87) PCT Pub. No.: WO2017/175192
PCT Pub. Date: Oct. 12, 2017

(65) Prior Publication Data
US 2019/0135352 A1    May 9, 2019

(30) Foreign Application Priority Data

Apr. 8, 2016  (IT) .................. 202016000036421

(51) Int. Cl.
*B62D 31/02*    (2006.01)
*B62D 55/06*    (2006.01)
(Continued)

(52) U.S. Cl.
CPC ............... *B62D 31/02* (2013.01); *B60J 1/08* (2013.01); *B60R 9/12* (2013.01); *B60R 13/083* (2013.01); *B62D 55/06* (2013.01); *E01H 4/02* (2013.01)

(58) Field of Classification Search
CPC . B62D 31/02; B62D 55/06; B60J 1/08; B60R 9/12; B60R 13/083; E01H 4/02
(Continued)

(56) References Cited

U.S. PATENT DOCUMENTS

| 1,436,286 A | * | 11/1922 | Ouradnik | .................. E01H 4/00 37/225 |
| 2017/0225603 A1 | * | 8/2017 | Campi | .................. B62D 55/06 |

FOREIGN PATENT DOCUMENTS

| AT | 343490 | 5/1978 |
| CN | 105377672 | 3/2016 |

(Continued)

OTHER PUBLICATIONS

Notification Concerning Submission, Obtention or Transmittal of Priority Document for International Application No. PCT/IB2017/052020 dated Jul. 4, 2017.
(Continued)

*Primary Examiner* — Jason S Marrow
*Assistant Examiner* — E Turner Hicks
(74) *Attorney, Agent, or Firm* — Neal, Gerber & Eisenberg LLP

(57) ABSTRACT

A snow groomer; the snow groomer comprising a support frame; a driver's cabin, which is fitted on the support frame; two track conveyors, which are fitted on opposite sides of the support frame; and a passenger cabin, which is distinct from the driver's cabin and is fitted on the support frame; the passenger cabin comprising a bearing structure; the bearing structure defining a protection cell configured to resist external loads; the bearing structure comprising housing seats; the passenger cabin comprising panels of transparent material, such as glass, which are housed in the housing seats of the bearing structure and are supported by the bearing structure.

21 Claims, 3 Drawing Sheets

(51) Int. Cl.
*B60J 1/08* (2006.01)
*B60R 9/12* (2006.01)
*B60R 13/08* (2006.01)
*E01H 4/02* (2006.01)

(58) Field of Classification Search
USPC .............................. 296/178, 190.08, 190.01
See application file for complete search history.

(56) References Cited

FOREIGN PATENT DOCUMENTS

| | | |
|---|---|---|
| CN | 109079739 | 12/2018 |
| DE | 202009001764 | 2/2010 |
| EP | 0541485 | 5/1993 |
| ES | 2356680 | 4/2011 |
| JP | H02139128 | 11/1990 |
| WO | WO 2014/060958 | 4/2014 |

OTHER PUBLICATIONS

Notification of Transmittal of the International Search Report and the Written Opinion for International Application No. PCT/IB2017/052020 dated Jun. 28, 2017.
European Office Action for Application No. 17 720 225.6 dated Mar. 16, 2020 (10 Pages).
Chinese Office Action (with translation) for Application No. 201780002814.0 dated Aug. 21, 2020 (11 pages).

\* cited by examiner

SNOW GROOMER

PRIORITY CLAIM

This application is a national stage application of PCT/IB2017/052020, filed on Apr. 7, 2017, which claims the benefit of and priority to Italian Patent Application No. 202016000036421, filed on Apr. 8, 2016, the entire contents of which are each incorporated by reference herein.

TECHNICAL FIELD

The present disclosure relates to a snow groomer.

In particular, the present disclosure relates to a snow groomer comprising a support frame; a driver's cabin fitted on the support frame; and two track conveyors, which are fitted on opposite sides of the support frame.

Each track conveyor comprises a set of rotary wheels fitted on the support frame, and a track wound in a ring shape around the wheels.

BACKGROUND

The snow groomer is usually equipped with a plurality of operating units, such as, for example, a mill to process the snow mantle of the ski slopes, a shovel to move snow masses along the ski slopes, and/or a winch assembly.

Some driver's cabins comprise, in addition to a seat for a driver, one or—at the most—two seats for possible passengers.

Certain of the drawbacks of certain prior art lies in the snow groomer being able to carry a very limited number of passengers.

SUMMARY

The object of the present disclosure is to provide a snow groomer, which is able to reduce certain of the drawbacks of certain of the prior art as described above.

According to the present disclosure, there is provided a snow groomer comprising a support frame; a driver's cabin, which is fitted on the support frame; two track conveyors, which are fitted on opposite sides of the support frame; and a passenger cabin, which is distinct from the driver's cabin and is fitted on the support frame; the passenger cabin comprising a bearing structure, which defines a protection cell configured to resist external loads; the bearing structure comprising housing seats; the passenger cabin comprising panels of transparent material, such as glass, which are housed in the housing seats of the bearing structure and are supported by the bearing structure.

It should be appreciated that the snow groomer of the present disclosure has a passenger cabin in addition to the driver's cabin, which enables a discrete number or quantity of passengers to be transported, also offering them a great view to enjoy the surrounding landscape. Said passenger cabin is extremely versatile as well as relatively easy and economical to be fitted on the snow groomer.

Additional features are described in, and will be apparent from the following Detailed Description and the figures.

BRIEF DESCRIPTION OF THE DRAWINGS

The present disclosure will now be described with reference to the accompanying drawings, which show a non-limiting embodiment thereof, wherein.

DETAILED DESCRIPTION

Figure 1:
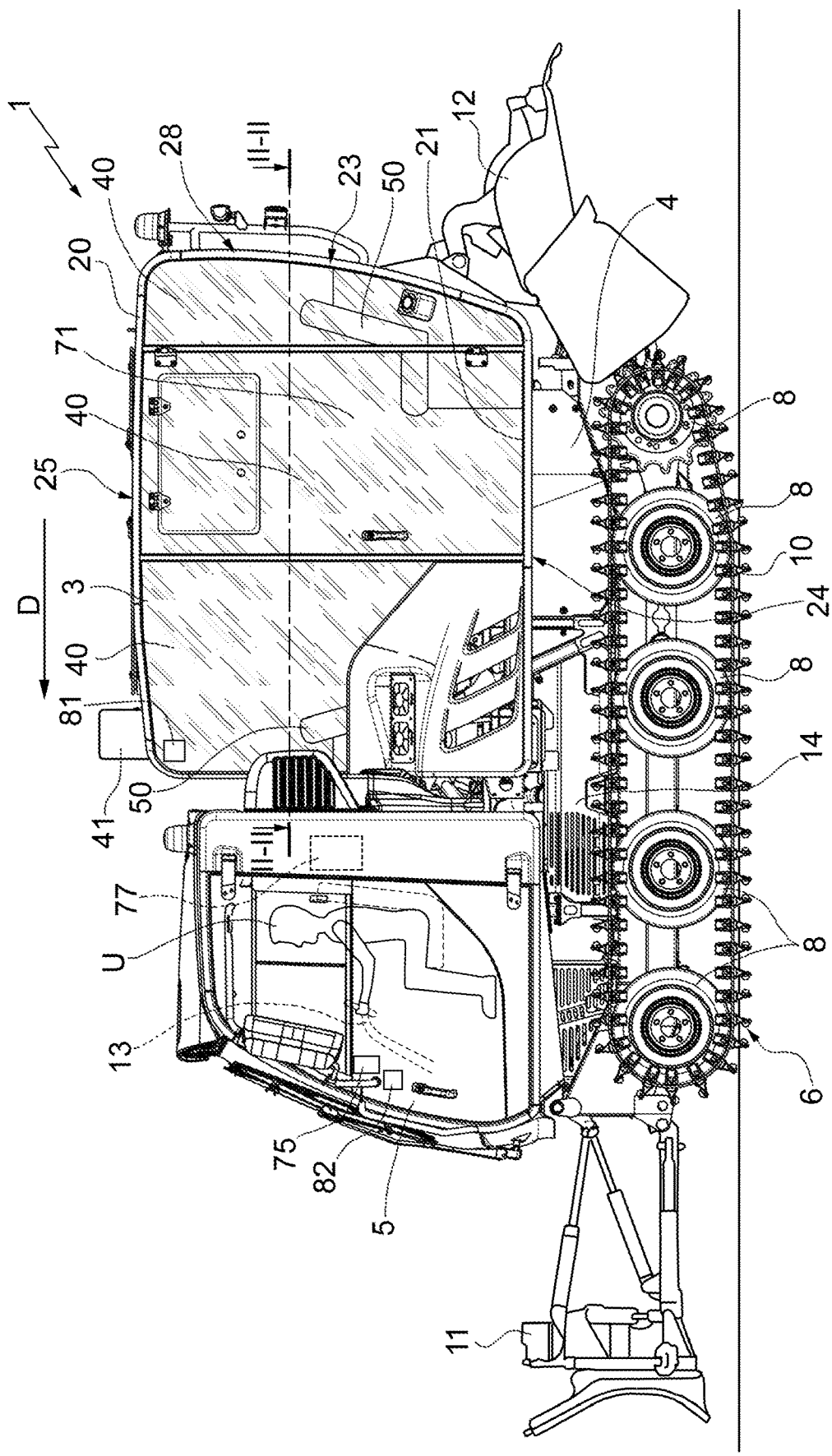
FIG. 1 is a side view, with parts removed for greater clarity, of an embodiment of the snow groomer according to the present disclosure.
Figure 2:
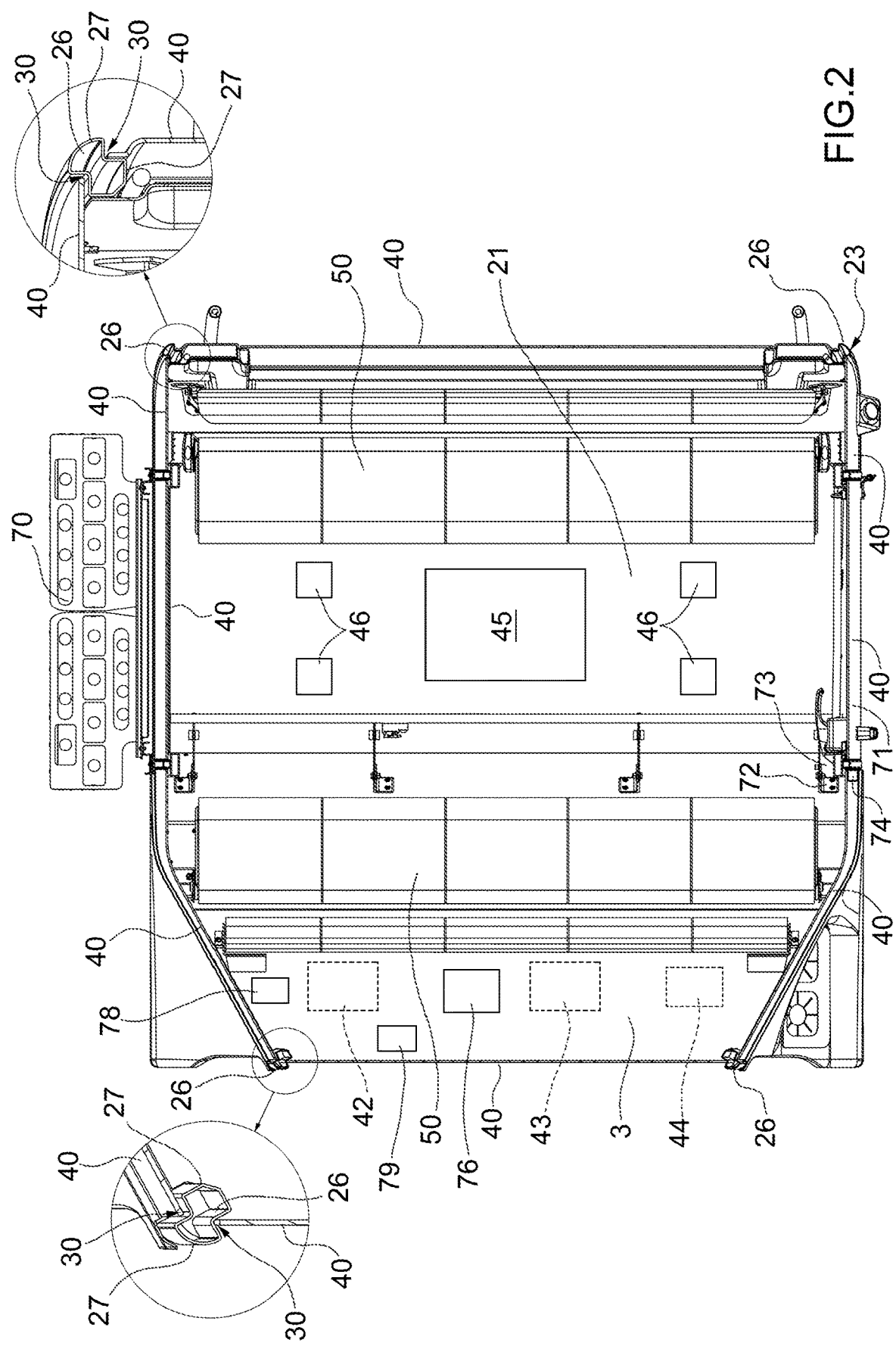
FIG. 2 is an enlarged sectional view, with parts removed for greater clarity and along section line II-II, of a detail of the snow groomer of FIG. 1.
Figure 3:
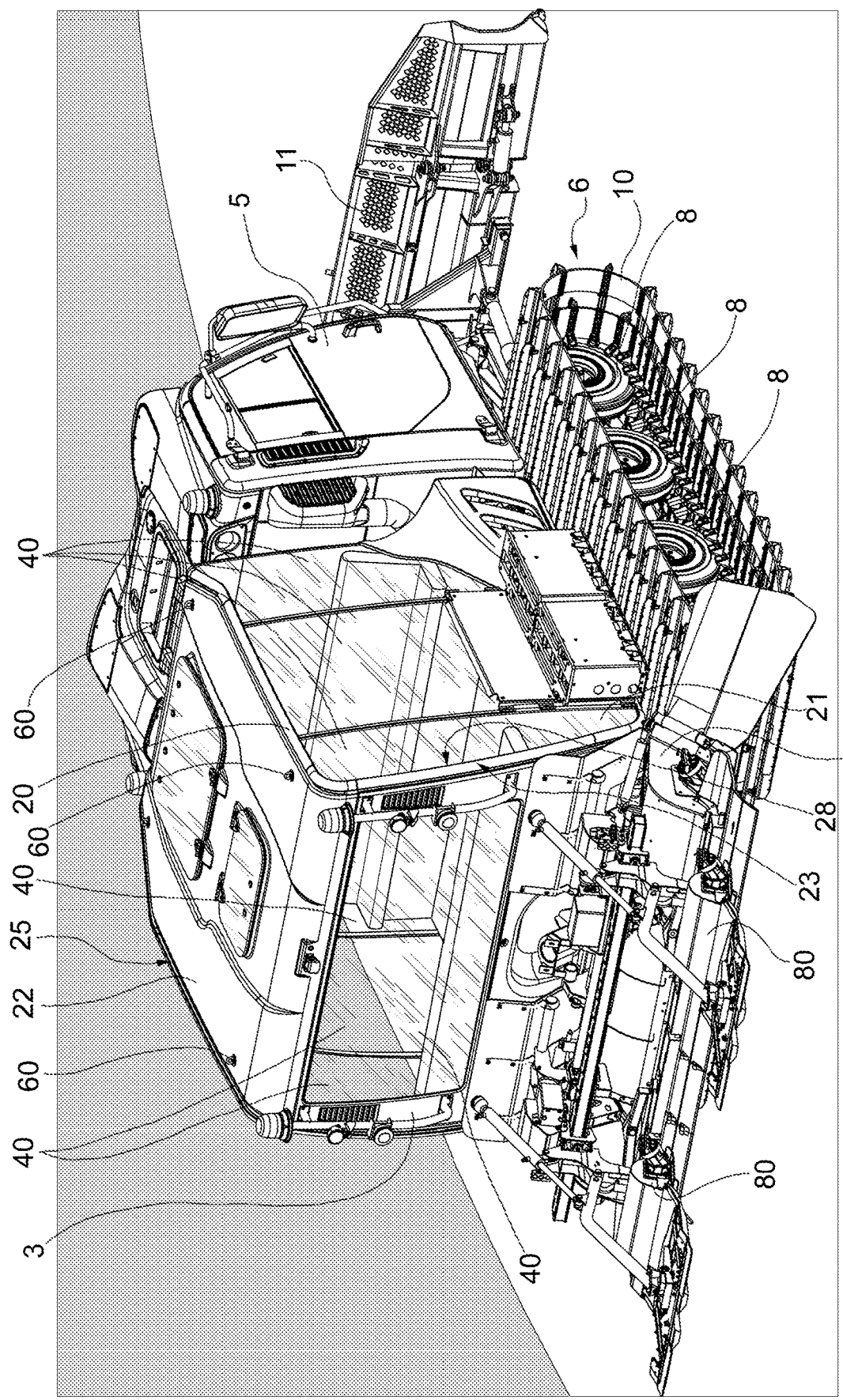
FIG. 3 is a perspective view of the snow groomer according the present disclosure.

Referring now to the example embodiments of the present disclosure illustrated in FIGS. 1 to 3 and specifically with reference to FIG. 1, number 1 indicates, as a whole, a snow groomer for the preparation of ski slopes.

The snow groomer 1 is engine-driven so as to move forward along a snow-covered path in a moving direction D, and comprises a support frame 4, a driver's cabin 5, which is fitted on the frame 4, a passenger cabin 3, and two track conveyors 6 (only one of them is shown in FIG. 1), which are fitted on opposite sides of the frame 4 in a direction that is transverse to the direction D and perpendicular to the plane of the sheet of FIG. 1.

Each conveyor 6 comprises a set of wheels 8, which are fitted on the frame 4 so as to rotate around respective rotation axes that are transverse to the direction D, and a track 10, which is wound in a ring shape around the front wheel 8 and the rear wheel 8, and has a lower branch, which is kept in contact with the ski slope by the intermediate wheels 8.

The snow groomer 1 is further provided with a shovel 11, which is connected to the front part of the frame 4 so as to move snow masses along the ski slope, and with a mill 12, which is connected to the rear part of the frame 4 so as to process a snow mantel of the snow-covered path.

The snow groomer 1 further comprises an internal combustion engine 14, which is connected to at least one of the front and rear wheels 8, to the shovel 11, to the mill 12 via a transmission unit (which is not shown in the accompanying figures).

The driver's cabin 5 comprises controls 13 to guide the movement of the snow groomer 1 and to control the operating units of the snow groomer 1, such as the shovel 11 and the mill 12. The driver's cabin 5 comprises a seat for a driver U of the snow groomer 1 and can comprise one or two passenger seats.

The passenger cabin 3 is distinct from the driver's cabin 5 and is configured to ensure relatively high comfort for the passengers. The passenger cabin 3 is provided with controls to guide the movement of the snow groomer 1. The passenger cabin 3 serves the purpose of transporting a plurality of passengers along a snow-covered path, in particular a number of passengers greater than two. In another embodiment, the number of passengers of the passenger cabin 3 is greater than six, such as ten or twelve. In other words, the passenger cabin 3 is separate from the driver's cabin 5. By so doing, the snow groomer 1 used for passenger transportation does not need to be re-designed, but it can use many parts in common with other snow groomers used for other functions. In other words, the same driver's cabin 5 can be used both for snow groomers 1 having a passenger cabin 3 like the one according to this present disclosure and for snow groomers 1 without the passenger cabin 3.

With reference to FIGS. 1 and 2, the passenger cabin 3 is fitted on the frame 4 via steel and rubber connectors (silent block) so as to dampen the vibrations of the frame 4 to the passenger cabin 3.

Furthermore, with reference to the accompanying figures, the passenger cabin 3 comprises a bearing structure 20 comprising a floor 21; a roof 22; and a tubular structure 23, which extends between the floor 21 and the roof 22 and supports the roof 22.

The bearing structure 20, in particular the tubular structure 23, defines a protection cell, which is resistant to external loads and is configured to ensure an optimal structural resistance in case of rollover. To this aim, the tubular structure 23 of the bearing structure 20 comprises a plurality of tubes 26, wherein each tube 26 has a profile, in its cross section view, having a bilobed shape (FIG. 2). In other words, each tube 26 has a profile that, in its cross section view, has two lobes 27, which are joined to one another close to the base. In more detail, the bilobed cross section is also called butterfly or 8-shaped cross section. With reference to FIG. 2, the tubes 26 comprise housing seats 30 in the area of the base of the lobes 27. In other words, the tubes 26 comprise recesses in the area of the base of the lobes 27, which define the housing seats 30.

The tubes 26 ensure a relatively greater resistance to loads and ensure the relative stiffness of the tubular structure 23 in case of rollover of the snow groomer 1.

In another embodiment of the present disclosure, the tubular structure 23 comprises tubes with a circular cross section and housing elements coupled to the tubes, which define housing seats for the panels of transparent material.

The passenger cabin 3 comprises side panels 40 of transparent material, which are interposed between the floor 21 and the roof 22 and have sides housed in the housing seats 20 of the tubes 26.

The tubular structure 23 comprises a lower portion 24 in the area of the floor 21, an upper portion 25 in the area of the roof 22, and an upright portion 28, which is interposed between the lower portion 24 and the upper portion 25. In the side portion 28, the tubes 26 extend along a direction that is transverse to the ground. In the upper portion 25, the tubes 26 extend along a direction that is parallel to the ground. In the lower portion 24, the tubes 26 extend along a direction that is parallel to the ground.

In more detail, the ends of the side panels 40 of transparent material are glued to the tubes 26 in the housing seats 30. In particular, the side panels 40 are interposed between the floor 21 and the roof 22 and extend transversely to the ground.

Furthermore, the panels 40 are glued to the side portion 28 and in the housing seats 30 of the tubular structure 23 along directions that are transverse to the ground.

The panels 40 are glued in the housing seats 30 of the lower portion 24 and of the upper portion 25 along directions that are parallel to the ground. As a consequence, the tubular structure 23 offers a flat support surface for the gluing of the panels 40.

The side panels 40 of transparent material cover side surfaces of passenger cabin 3 and, as a consequence, the passenger cabin 3 offers an optimal view of the space surrounding the snow groomer 1 and a relatively high level of safety, as the tubular structure 23 ensures structural stiffness in case of rollover or fall of objects from above.

The transparent side surface of the passenger cabin 3 is greater than 50% of the total side surface, and in certain embodiments, greater than 54%.

In another embodiment, the transparent side surface is greater than 60% of the total side surface, and in certain embodiments, greater than 64%.

In certain embodiments of the present disclosure, the panels 40 of transparent material comprise UV ray filters to reduce the access of UV rays to the passenger cabin 3. To this aim, the panels 40 are made of a transparent material with UV ray filtering properties and have a neutral colour.

In another embodiment, the panels 40 are made of a transparent material with UV ray filtering properties and have a colour shade.

In another embodiment, the panels 40 comprise mirror films, which ensure visibility from the inside of the passenger cabin 3 to the outside, though filtering light and, in particular, UV rays from the outside of the passenger cabin 3 to the inside.

The roof 22 is made of sheet metal. In another embodiment, the roof 22 is made of plastic. In another embodiment, the roof 22 is made of glass fibre.

In an alternative embodiment (which is not shown in the accompanying figures), the roof 22 is a panel of transparent material, for example glass. In this embodiment, the passenger cabin 3 comprises a darkening blind to protect the inside of the passenger cabin 3 from sunlight. The panel of transparent material comprises UV filter to screen UV rays. In this embodiment, the transparent surface of the passenger cabin 3, including the side surface and the upper surface (of the roof 23), is greater than 65% of the total side and upper surface, in particular greater than 68%.

In another embodiment of the present disclosure, in which the roof 23 is made of a transparent material, the transparent surface, including the side surface and the upper surface, is greater than 70% of the total side and upper surface, in particular greater than 75%.

In this embodiment, from the inside of the passenger cabin 3, a passenger can also see the sky and this allows the passenger, for example, to watch the stars when the snow groomer 1 is used during the night for the transportation of passengers.

In an embodiment, the panels 40 of transparent material made of glass are made of laminated glass to resist impacts or heavy loads.

In another embodiment, the panels 40 are made of a transparent plastic material, for example polymethyl methacrylate (Plexiglas).

The floor 21 of the passenger cabin 3 comprises anti-noise barriers to increase silence on the inside of the passenger cabin 3; in other words, the aforesaid anti-noise barriers serve the purpose of limiting the noise coming from the bottom of the passenger cabin 3 where the tracks 10 and the engine 14 are located.

The floor 21 comprises a trap door 45 to access a portion of the snow groomer 1 located under the passenger cabin 3, so as to enable the maintenance of the snow groomer 1.

The passenger cabin 3 comprises seats 50 for the passengers, in particular two rows of seats 50 arranged at the front and at the back of the passenger cabin 3, depending on the direction of movement. In the embodiment shown herein, each row of seats is configured to accommodate five passengers. In other embodiments, each row of seats can accommodate from two to six passengers.

In an embodiment of the present disclosure, the passenger cabin 3 is provided with a table to use the passenger cabin 3 as a refreshment place for the passengers, for example to enjoy lunch or dinner. In this embodiment, the transparency towards the outside of the passenger cabin 3 is highly appreciated and, in this embodiment, the roof 23 of transparent material is very treasured as well, as it allows passengers to enjoy dinners under a sky filled with stars.

In an embodiment, the passenger cabin 3 comprises an air conditioning assembly 41 on the roof 22. The passenger cabin 3 is fitted with a fresh air recirculation system, which is provided with filters.

In an embodiment, the passenger cabin 3 comprises battery chargers 42 for mobile phones and internet connection services 43.

In this embodiment, the passenger cabin 3 comprises a storage box 44 to safely store objects, such as mobile phones or other personal belongings of the passengers.

In another embodiment, the passenger cabin 3 comprises one or more hooks 46 to fix a stretcher to the floor 23 for the transportation of patients; in this case, the snow groomer 1 can be used in a rescue operation.

In another embodiment, the passenger cabin 3 comprises one or more hooks 46 to fix a load or a pallet with a load fixed on top of it; in this case, the passenger cabin 3 is used for the transportation of goods.

Furthermore, the passenger cabin 3 comprises one or more hooks 60 to lift the passenger cabin 3 from above when the snow groomer 1 is being assembled.

In an embodiment shown in FIGS. 2 and 3, the passenger cabin 3 comprises ski rack elements 70 on the outside of the passenger cabin 3, which are fixed to a side of the passenger cabin 3, such as a side opposite to an access door 71 of the passenger cabin 3. The ski rack elements 70 comprise seats to house skis and seats to house snowboards.

In an embodiment shown in FIG. 3, the snow groomer 1, in addition to the mill 12, comprises a system of course forming devices 80 configured to create cross-country skiing courses. In this embodiment, the snow groomer 1 can process the snow mantle and, at the same time, transport passengers along a snow-covered path; by so doing, the snow groomer 1 simultaneously offers two services and, as a consequence, it increases the total value obtained. Another advantage of this embodiment is that passengers can see how the mill 12 and/or the course forming device 80 are working and this is useful both when you need to show a demonstration to a potential customer and when experts of the snow groomer 1 need to make sure that it works properly.

The passenger cabin 3 comprise a telescopic ladder under the floor 21 of the passenger cabin 3 to allow passengers to climb into and out of the cabin itself. The telescopic ladder is completely masked by the closing of the access door 71 and remains invisible when the access door 71 is closed.

The access door 71 comprises a first and a second closing element 72 and 73, so that the access door 71 can be exclusively opened when both the first and the second closing element are disengaged.

The passenger cabin 3 comprises a sensor 74, which is configured to detect the opening of the access door 71. The sensor 74 is coupled to a displaying element 75, for example a display or a light indicator, which is housed on the inside the driver's cabin 5 and warns the driver U about the opening of the access door 71.

The passenger cabin 3 comprises an alarm button 76 to allow passengers to warn the driver U about the occurrence of an anomalous event. The alarm button 76 is coupled to a displaying element 75, for example a display or a light indicator; and/or to an acoustic element 77, for example a buzzer or a loudspeaker or a bell, which is housed on the inside of the driver's cabin 5 and warns the driver U about the occurrence of an anomalous event in the passenger cabin 3.

The passenger cabin 3 comprises a microphone 78 and a loudspeaker 79 to communicate with the driver's cabin 5.

The passenger cabin 3 comprises a video camera 81, which is aimed at the inside of the passenger cabin 3 so as to shoot the inside of the passenger cabin 3, and is coupled to an image displaying element 82, for example a display, which is housed on the inside of the driver's cabin 5 so as to show the images shot in the passenger cabin 3.

Furthermore, it is evident that the present disclosure also covers embodiments not described in the detailed description and equivalent embodiments that fall within the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A snow groomer comprising:
   a support frame;
   a driver cabin fitted on the support frame;
   two track conveyors fitted on opposite sides of the support frame; and
   a passenger cabin that is distinct from the driver cabin and fitted on the support frame, the passenger cabin comprising:
      a bearing structure defining a protection cell configured to resist an external load, the bearing structure comprising:
         a plurality of housing seats, and
         a lower portion extending in an area of a floor,
      a plurality of anti-noise barriers fixed in the area of the floor, and
      a plurality of panels of transparent material, which are partly coupled to the housing seats of the bearing structure and are supported by the bearing structure.

2. The snow groomer of claim 1, wherein the transparent material comprises glass.

3. The snow groomer of claim 1, further comprising a transparent side surface that is greater than 50% of a total side surface.

4. The snow groomer of claim 1, further comprising a transparent side surface that is greater than 60% of a total side surface.

5. The snow groomer of claim 1, further comprising a transparent side surface that is greater than 74% of a total side surface.

6. The snow groomer of claim 1, wherein the plurality of panels of transparent material comprise ultraviolet filters to reduce passage of ultraviolet rays.

7. The snow groomer of claim 1, wherein the bearing structure comprises a tubular structure.

8. The snow groomer of claim 7, wherein the tubular structure comprises at least one tube having a shape of two lobes.

9. The snow groomer of claim 8, wherein the housing seats are defined between the two lobes of the tubular structure.

10. The snow groomer of claim 7, wherein:
    the passenger cabin comprises a floor and a roof, and
    the bearing structure comprises a side portion extending between the floor and the roof.

11. The snow groomer of claim 1, wherein:
    the passenger cabin comprises a roof comprising a panel of transparent material, and
    the bearing structure comprises a plurality of upper portions extending in an area of the roof, wherein the panel of transparent material of the roof is housed between the upper portions of the bearing structure.

12. The snow groomer of claim 1, further comprising a ski rack system comprising a plurality of housing compartments configured to store at least one of a plurality of skis and a plurality of snowboards.

13. The snow groomer of claim 1, further comprising a communication system between the driver cabin and the passenger cabin and configured to send a message between the driver cabin and the passenger cabin.

14. A snow groomer comprising:
a support frame;
a driver cabin fitted on the support frame;
two track conveyors fitted on opposite sides of the support frame;
a passenger cabin that is distinct from the driver cabin and fitted on the support frame, the passenger cabin comprising:
a bearing structure comprising a plurality of housing seats and defining a protection cell configured to resist an external load, and
a plurality of panels of transparent material, which are partly coupled to the housing seats of the bearing structure and are supported by the bearing structure; and
a communication system between the driver cabin and the passenger cabin, the communication system configured to send a message between the driver cabin and the passenger cabin.

15. The snow groomer of claim 14, further comprising a transparent side surface that is greater than 50% of a total side surface.

16. The snow groomer of claim 14, further comprising a transparent side surface that is greater than 60% of a total side surface.

17. The snow groomer of claim 14, further comprising a transparent side surface that is greater than 74% of a total side surface.

18. The snow groomer of claim 14, wherein the plurality of panels of transparent material comprise ultraviolet filters to reduce passage of ultraviolet rays.

19. The snow groomer of claim 14, wherein the bearing structure comprises a tubular structure comprising at least one tube having a shape of two lobes, wherein the housing seats are defined between the two lobes of the tubular structure.

20. The snow groomer of claim 14, wherein:
the passenger cabin comprises a roof comprising a panel of transparent material, and
the bearing structure comprises a plurality of upper portions extending in an area of the roof, wherein the panel of transparent material of the roof is housed between the upper portions of the bearing structure.

21. The snow groomer of claim 14, further comprising a ski rack system comprising a plurality of housing compartments configured to store at least one of a plurality of skis and a plurality of snowboards.

* * * * *